United States Patent [19]

Kaizaki

[11] Patent Number: 4,597,612

[45] Date of Patent: Jul. 1, 1986

[54] DEVICE FOR PREVENTING AN ENDLESS TRACK VEHICLE FROM DAMAGING A PAVED ROAD SURFACE

[76] Inventor: Michikazu Kaizaki, 145-1, Asano, Yabu-Cho, Yabu-gun, Hyogo-ken, Japan

[21] Appl. No.: 698,455

[22] Filed: Feb. 5, 1985

[30] Foreign Application Priority Data

Feb. 14, 1984 [JP] Japan .............................. 59-20131[U]

[51] Int. Cl.⁴ ........................................... B62D 55/28
[52] U.S. Cl. ......................................... 305/51; 305/52
[58] Field of Search ....................... 305/39, 51, 52, 54, 305/35 R

[56] References Cited

U.S. PATENT DOCUMENTS

| 1,568,090 | 1/1926 | Saives | 305/51 |
| 3,441,321 | 4/1969 | Darland | 305/51 X |
| 4,165,906 | 8/1979 | Fix | 305/51 |
| 4,461,516 | 7/1984 | Lee | 305/51 X |

Primary Examiner—David A. Scherbel
Attorney, Agent, or Firm—Eugene E. Geoffrey, Jr.

[57] ABSTRACT

An improved attachment for an endless track vehicle or crawler, which is attached to shoe plates of the vehicle tracks for preventing the vehicle track running on a paved road from damaging the road surface.

3 Claims, 6 Drawing Figures

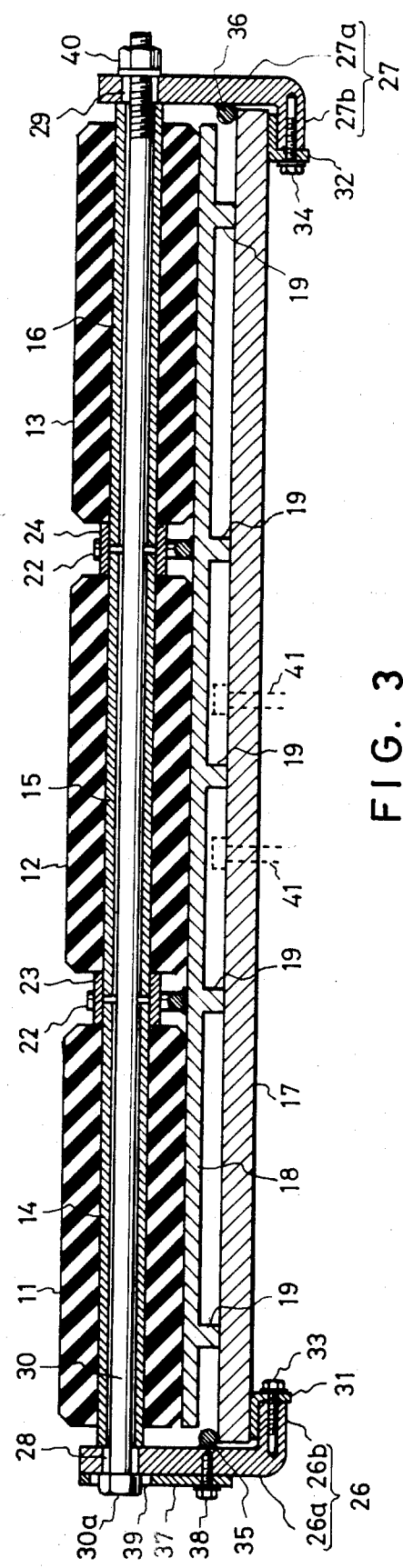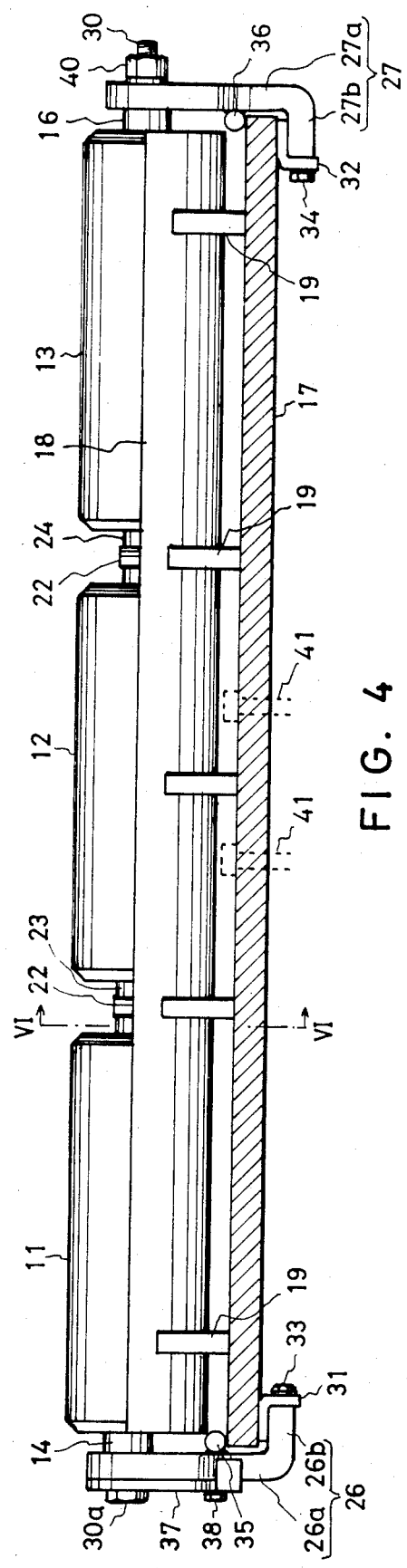

DEVICE FOR PREVENTING AN ENDLESS TRACK VEHICLE FROM DAMAGING A PAVED ROAD SURFACE

This invention relates to an attachment which is attached to each shoe-plate of a endless track vehicle or crawler in order to prevent the vehicle running on a paved road from damaging the road surface with its hard tracks.

An idea of preventing damage of a paved road surface caused by endless tracks by attaching rubber bobbins to the tracks was provided by the present inventor and its content is disclosed in the opened Japanese utility model specification No. 58-132785, as a summary thereof is described later with reference to drawings. Although this device has exhibited such advantages that it is easily attachable and detachable and facilitates change of direction and that it is possible to change a landing position of the bobbin, when a part thereof has been worn down, to extend its lifetime, it has also provided such problems that, in case of a wide track, it becomes often impossible to change the landing position of the bobbin due to its deformation and that heavy wear of a part of the bobbin results in need of interchanging the whole bobbin in spite of little wear of the other part.

Accordingly, an object of this invention is to provide an improved attachment which removes the abovementioned problems of the prior art in a wide track vehicle and enables always to change the landing position of the bobbin and to interchange a part of the bobbin when this part has been worn down heavily.

In accordance with this invention, an attachment to be attached to each shoe-plate of an endless track vehicle comprises a plurality of (generally, two or three) rubber bobbins, each having a reinforcing steel pipe core having the both ends extending a little from the both end faces of the rubber bobbin. The total length of these rubber bobbins aligned axially is substantially equal to the width of a shoe-plate of the track to which they are to be attached. On the other hand, in a groove between a pair of ridges on the surface of each shoe-plate of the tracks, there is a trough-like receptacle having legs at suitable intervals. These legs are contoured to fit in the groove of the shoe-plate and the curvature of the inner surface of the trough-like receptacle is nearly equal to that of the outer surface of the rubber bobbin. Thus, the axially aligned rubber bobbins are placed over the groove of each shoe-plate of the track through the trough-like receptacle in a stable attitude. Then, a pair of L-shaped fixture members having one leg extending to the back of the shoe-plate are fixed to the both ends of the line of rubber bobbins by a long bolt inserted in the steel cores of the rubber bobbins, thereby the rubber bobbins are firmly attached to each shoe-plate.

When the vehicle is driven, especially, when it changes its direction of motion, a stress is applied to each rubber bobbin in such a direction to bend the bolt. However, the trough-like receptacle serves to prevent the rubber bobbins from being moved by the stress, thereby preventing deformation of the bolt. Therefore, the rubber bobbin landing position changing operation would no longer be obstructed. Moreover, when a part of the rubber bobbins has been worn down, only the worn bobbin can be interchanged and this provides an economical effect.

These and other objects and features of this invention will be described in more detail below with reference to the accompanying drawings.

In the drawings:

FIG. 3 is a sectional side view representing an embodiment of the improved attachment according to this invention, attached to a shoe-plate of an endless track;

FIG. 4 is a side view of the embodiment as shown in FIG. 3;

Throughout the drawings, same reference numerals are given to same structural components.

Figure 1:
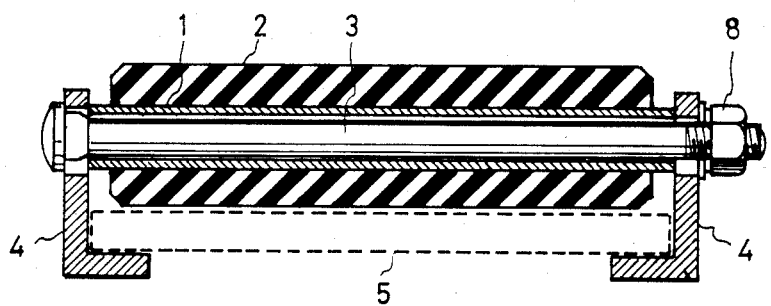
FIG. 1 is a sectional side view representing a prior art attachment for preventing damage of a paved road surface.
Figure 2:
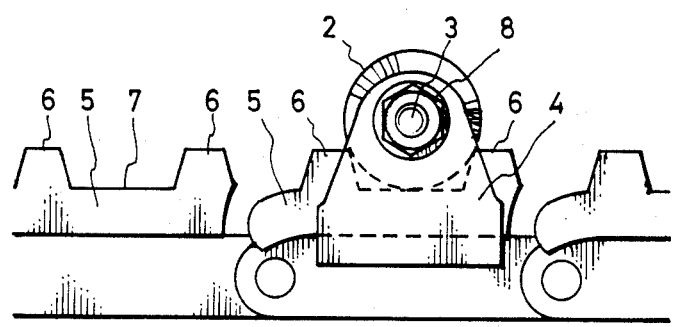
FIG. 2 is an end view representing the attachment of FIG. 1 attached to a shoe-plate of an endless track vehicle.
Figure 5:
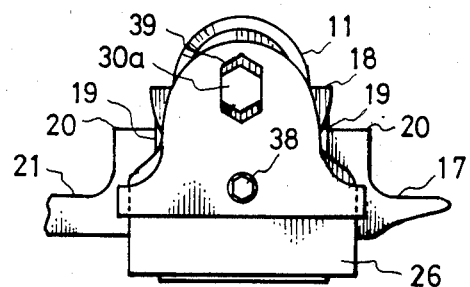
FIG. 5 is an end view representing the embodiment of FIGS. 3 and 4.

As shown in FIGS. 1 and 2, the attachment disclosed in the abovementioned opened Japanese utility model specification includes a rubber bobbin 2 having a reinforcing steel pipe core 1 and a pair of L-shaped fixture members 4 coupled to the both ends of the bobbin 2 with a bolt 3 inserted in the steel pipe 1, and attached to an endless track by fitting the bobbin 2 in a groove 7 between a pair of ridges 6 formed on a surface of each shoe-plate 5 of the track and tightening a nut 8 fitting to the bolt 3 after locating the other legs of the fixture members 4 on the back of the shoe-plate 5. As readily understood from the drawings, this attachment is easily attachable and detachable and can be used again when a part of the bobbin 2 has been worn down, by changing its landing position by rotating it by some angle. However, when it is adapted for a wide track having a width of several tens centimeters or more, the steel pipe 1 and/or the bolt 3 may be bent to disable the bobbin landing position changing operation, or it may be necessary to interchange the whole bobbin 2 when a part thereof has been heavily worn down, even if the other part has not been worn down so much.

Now, the invention will be described in conjunction with the embodiment as shown in FIGS. 3 through 6.

Rubber bobbins 11, 12 and 13 have reinforcing steel pipe cores 14, 15 and 16, respectively, and the both ends of each reinforcing steel pipe extends a little from the both end faces of each rubber bobbin. As shown in FIGS. 3 and 4, the total length of these rubber bobbins 11, 12 and 13 aligned axially is substantially equal to the width of an endless track shoe-plate 17.

A stout hemicylindrical trough-like receptacle 18 made of steel has an inner surface having a curvature substantially equal to that of the outer surfaces of the rubber bobbins 11, 12 and 13. The receptacle 18 has a plurality of legs 19 at suitable positions on its outer surface and each leg 19 has a contour which is substantially same as the contour of a groove 21 between a pair of ridges 20 on the surface of each shoe-plate 17. Stoppers 22 are disposed in the receptacle 18 at such positions where the steel pipes 14, 15 and 16 abut mutually when the rubber bobbins 11, 12 and 13 are arranged as shown in FIGS. 3 and 4. Each stopper 22 has a shape of "U" whose inner width D is substantially equal to the outer diameter of undermentioned connecting tubes 23 and 24.

L-shaped fixture members 26 and 27 have legs 26a and 27a, respectively, having bolt holes 28 and 29 in the vicinities of their ends. Each bolt hole is a slot hole having a width substantially equal to the diameter of undermentioned bolt 30. The other legs 26b and 27b of the fixture members 26 and 27 have thickness adjusting plates 31 and 32 tightened thereto by bolts 33 and 34, respectively. The thickness adjusting plates 31 and 32 are folded along the inner surfaces of the legs 26b and 27b of the fixtures 26 and 27, respectively. Stopper rods 35 and 36 are welded respectively to the first legs 26a and 27a of fixtures 26 and 27. The welding position of the stopper rods 35 and 36 and the thickness of the adjusting plates 31 and 32 are selected so as to conform to the thickness of the corresponding caterpillar shoe-plate 17. A locking plate 37 having a slot 39 which conforms to the head 30a of bolt 30 is put on the outer surface of the first leg 26a of the fixture 26 and tightened thereto with a bolt 38 for preventing rotation of the bolt 30.

When the attachment is attached to the track shoe-plate 17, the fixture member 26, rubber bobbin 11, connecting tube 23, rubber bobbin 12, connecting tube 24, rubber bobbin 13 and fixture member 27 are fit on the bolt 30 in this order and a nut 40 is fit loosely thereto, so that the ends of the second legs 26b and 27b of the fixtures 26 and 27 can expand sufficiently to clear the both edges of the shoe-plate 17. The connecting tubes 23 and 24 have an inner diameter substantially equal to the outer diameter of the steel pipes 14, 15 and 16, so that they fit on the exposed ends of the steel pipes to connect the rubber bobbins 11, 12 and 13.

Next, the legs 19 of the trough-like receptacle 18 are fit in the groove 21 of the track shoe-plate 17, the rubber bobbins 11, 12 and 13 are placed in the receptacle 18 and the connecting tubes 23 and 24 are positioned in the U-shaped stoppers 22, as shown in the drawings. This can be done easily by expanding the fixture members 26 and 27 to clear the shoe-plate 17. Finally, the nut 40 is tightened to firmly fix the rubber bobbins 11, 12 and 13 to the shoe-plate groove 21.

While the three rubber bobbins are attached to each shoe-plate groove of the right and left track, they need not be attached to every groove of every shoe-plate, but it is enough to attach them to every or every other or every third shoe-plate of each caterpillar.

Figure 6:
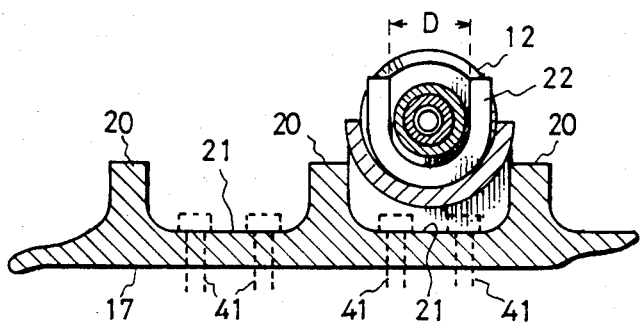
FIG. 6 is a cross-sectional view taken along line VI—VI of FIG. 4.

With the abovementioned inventive attachments, change of direction during running can be effected easily as in the case of the prior art attachment disclosed in the aforementioned opened Japanese utility model specification No. 58-132785. The inventive attachment can be attached to and detached from the caterpillar since this can be done by only tightening or releasing the single nut 40. Moreover, it can be used for a long time by changing the landing position of each rubber bobbin when it has been partially worn down. In addition, the stout trough-like receptacle disposed between the rubber bobbins and each track shoe-plate, having its legs firmly fit in the shoe-plate groove, precludes application of bending stress to the reinforcing steel pipes 14, 15 and 16 and to the bolt 30 even if the width of track is increased, and no deformation will occur in these components. Therefore, the rubber bobbin landing position changing operation can be executed at any time. Even when bolts 41 for coupling the shoe-plate to a caterpillar link extend from the bottom of the shoe-plate groove 21 as shown in FIG. 6; the rubber bobbins can be supported in a stable attitude without contact to these bolts 41. Although the contour of the shoe-plate groove 21 will differ from vehicle to vehicle, the same attachment can be adapted for every vehicle by only changing the contour of the legs 19 of the trough-like receptacle 18. When any one of the rubber bobbins 11, 12 and 13 has especially been worn down or damaged, it is enough to interchange only the same.

What is claimed is:

1. An attachment to be fit in a groove in an endless track vehicle shoe-plate for preventing the vehicle from damaging a paved road surface, comprising a bolt having an effective length a little greater than the width of said shoe-plate, a tightening nut to be fit to said bolt, a plurality of rubber bobbins each having a reinforcing steel pipe core in which said bolt can be inserted, a pair of L-shaped fixture members each having a hole for said bolt formed in one leg thereof, a trough-like receptacle having an inner surface whose curvature is substantially equal to that of the outer surface of said rubber bobbins and including a plurality of support legs each having a contour conforming to the contour of said groove in the shoe-plate, one of said fixture member, said rubber bobbins and the other of said fixture members being fit on said bolt in this order, said nut being tightened, said rubber bobbins being contacted with the inner surface of said receptacle, and said shoe-plate being placed between said support legs of said receptacle and the other legs of said fixture members.

2. The attachment, in accordance with claim 1, wherein the both ends of said reinforcing steel pipe core extends a little from the both end faces of said rubber bobbin, and a connecting tube is fit on the adjoining ends of said steel pipe cores of the adjoining rubber bobbins.

3. The attachment, in accordance with claim 2, wherein U-shaped support members are disposed between the rubber bobbins and said support members contact with both said receptacle and said connecting tubes.

* * * * *